United States Patent
Kersch et al.

(10) Patent No.: US 9,571,401 B2
(45) Date of Patent: Feb. 14, 2017

(54) TECHNIQUE FOR PROJECTING NETWORK LOAD IN A COMMUNICATION NETWORK

(75) Inventors: Péter Kersch, Budapest (HU); Gabor Nemeth, Budapest (HU); Laszlo Toka, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 111 days.

(21) Appl. No.: 14/376,584

(22) PCT Filed: Feb. 9, 2012

(86) PCT No.: PCT/EP2012/000582
§ 371 (c)(1),
(2), (4) Date: Sep. 11, 2014

(87) PCT Pub. No.: WO2013/117201
PCT Pub. Date: Aug. 15, 2013

(65) Prior Publication Data
US 2015/0085656 A1    Mar. 26, 2015

(51) Int. Cl.
*H04L 12/803* (2013.01)
*H04L 12/911* (2013.01)
*H04L 12/26* (2006.01)

(52) U.S. Cl.
CPC ......... *H04L 47/125* (2013.01); *H04L 43/0876* (2013.01); *H04L 47/823* (2013.01); *H04L 47/822* (2013.01)

(58) Field of Classification Search
None
See application file for complete search history.

(56) References Cited

U.S. PATENT DOCUMENTS

2013/0080617 A1\* 3/2013 Driesen ............... H04L 43/0876
709/224

FOREIGN PATENT DOCUMENTS

| EP | 1383284 A1 | 1/2004 |
| EP | 1944922 A1 | 7/2008 |
| EP | 1998508 A1 | 12/2008 |

\* cited by examiner

*Primary Examiner* — Huy D Vu
*Assistant Examiner* — Teisha D Hall
(74) *Attorney, Agent, or Firm* — Murphy, Bilak & Homiller, PLLC (57) ABSTRACT

A technique for predicting network load in a communication network is described. For multiple subscriptions, a network load snapshot is provided. The network load snapshot comprises multiple network load records. Each network load record reflects network load caused by an associated subscription in the network at a particular point of time. Each network load record comprises at least one network load value reflecting a network load caused by the corresponding subscription and at least one network load influencing factor reflecting a parameter associated with the subscription which has the potential of influencing the network load value. The network load snapshot is transformed into a predicted network load snapshot comprising at least one predicted network load record, each predicted network load record reflecting estimated network load caused by the corresponding subscription at a particular point of time in the future. The transformation of a network load snapshot into a corresponding predicted network load snapshot is done based on both the network load values and the associated network load influencing factors.

12 Claims, 7 Drawing Sheets

| Subscriber identifier | Device type | OS | Other network load influencing factors | Application | Monthly traffic |
|---|---|---|---|---|---|
| 1111111111 | Smartphone | Type A | | Online audio | 12 MB |
| 1111111111 | Smartphone | Type A | | Online video | 271 MB |
| 1111111112 | Smartphone | Type B | | Online audio | 65 MB |
| 1111111112 | Smartphone | Type B | | Online video | 226 MB |
| 1111111113 | PC dongle | - | | Online audio | 178 MB |
| 1111111113 | PC dongle | - | | Online video | 899 MB |

| Subscriber identifier | Device type | OS | Other network load influencing factors | Application | Monthly traffic |
|---|---|---|---|---|---|
| 1111111111 | Smartphone | Type A | | Online audio | 74 MB |
| 1111111111 | Smartphone | Type A | | Online video | 209 MB |
| 1111111112 | Smartphone | Type B | | Online audio | 65 MB |
| 1111111112 | Smartphone | Type B | | Online video | 226 MB |
| 1111111113 | PC dongle | - | | Online audio | 201 MB |
| 1111111113 | PC dongle | - | | Online video | 879 MB |

Fig. 7

TECHNIQUE FOR PROJECTING NETWORK LOAD IN A COMMUNICATION NETWORK

TECHNICAL FIELD

The present disclosure generally relates to the technical field of communication networks. In particular, the present disclosure relates to a technique for projecting network load in a communication network.

BACKGROUND

Communication networks transfer a variety of different types of information between service providers and customers. For example, various kinds of wireless and wired communication networks are used to interconnect computing devices (such as personal computers, workstations, mobile devices, video-enabled phones, etc.) for use in both personal and business environments.

The level of network load resulting from the network traffic (voice, video, data, etc.) in complex communication networks (e.g., in an Internet Protocol (IP)-based network) can greatly fluctuate, and trends in usage can vary over periods of time. Network operators must attempt to ensure both Quality of Service (QoS) guarantees for services provided and Service Level Agreement (SLA) requirements to customers. IP and other networks should thus be able to adapt to changing trends in network load in order to efficiently utilize resources of the network, and to ensure QoS and satisfy SLA requirements.

Physical changes to the network, such as upgrading of network link hardware, the addition of new network links, etc., that are needed to respond to changes in network load, require planning and time to implement. Due to the lag-time between the detection of changing network requirements and the implementation of an appropriate technical solution, a situation may arise where the solution that is implemented is itself outdated in view of the current network requirements. Thus, a reliable projection of network load trends is important for network operators in order to be able to optimize network investments and network services.

Figure 1:
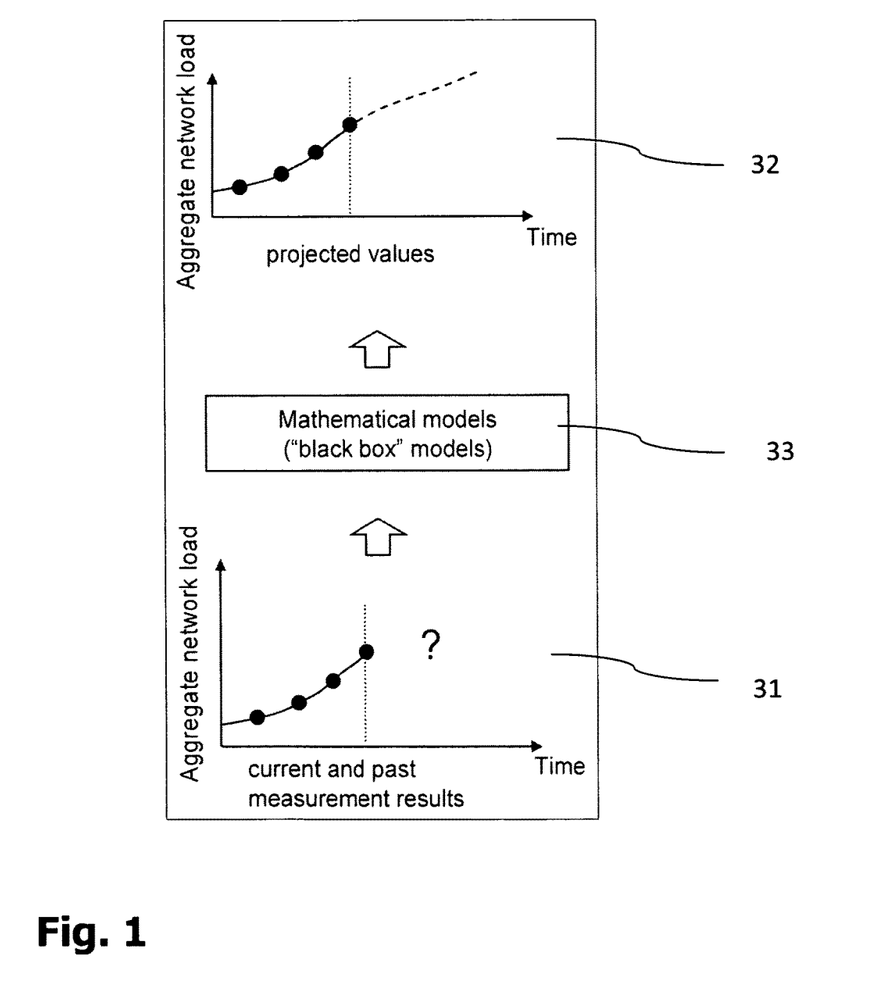
FIG. 1 is a schematic diagram illustrating a conventional technique of projecting network load in a communication network.

FIG. 1 shows an example of conventional network load projection technique. In this technique, based on aggregated network load measurements 31, future aggregated network load measurements 32 are predicted using mathematical models 33. The aggregation is typically performed over measurements carried out for different subscriptions. It has been found that since network load prediction as shown in FIG. 1 is based on aggregated network load measurements and fixed mathematical models, the preciseness of prediction is limited.

SUMMARY

A need arises to provide a network load projection technique which is capable of more reliably predicting future network load.

According to a first aspect, a method for projecting network load in a communication network is provided, in which, for multiple subscriptions, a load snapshot is provided. The network load snapshot comprises multiple network load records, wherein each network load record reflects network load caused by an individual subscription in the network at a particular point of time. Each network load record comprises at least one network load value reflecting a network load caused by the corresponding subscription and at least one network load influencing factor reflecting a parameter associated with the subscription which has the potential of influencing the network load value. The network load snapshot is transformed into a projected network load snapshot comprising multiple projected network load records, each projected network load record reflecting estimated network load caused by the corresponding subscription at a particular point of time in the future. The transformation of the network load snapshot into the corresponding projected network load snapshot is done based on both the network load values and the associated network load influencing factors.

Compared to conventional network load projection techniques, not only network load values as such are taken into consideration, but also associated underlying network load influencing factors. Those factors may have an influence on the network load (for example an influence in the sense that, for a particular subscription, the corresponding network load value potentially changes as soon as one of the assigned network load influence factors changes, or an influence in the sense that, for a particular subscription, the corresponding network load value potentially changes as soon as one of the assigned network load influence factors is deleted or newly added).

Each network load record may be assigned to one of a plurality of subscriptions (or "network users"). Each network load record may comprise one or more network load values, optionally sorted by network load influencing factors. Thus, a network load snapshot may comprise network load records of several subscriptions, and, optionally, several network load records per subscription. Similar considerations apply for the projected network load records.

The process of transforming the network load snapshot into the corresponding projected network load snapshot may be done based on one or more trending assumption parameters which reflect a future scenario affecting the network load respectively caused by the subscriptions.

One or both of the network load influencing factors and the network load values may be modified based on the one or more trending assumption parameters. As an example, transforming the network load snapshot into the projected network load snapshot may be based on the network load values and the modified network load influencing factors. The one or more trending assumption parameters may relate to an evolution, or development, of at least one of a data cap, a user terminal type population, a user terminal population with a given operating system terminal, and a population of a user application.

The process of transforming a network load snapshot into a corresponding projected network load snapshot may be done based on an algorithm which is adjusted based on a comparison process which compares the projected network load snapshot with an actual network load snapshot generated at a point of time which corresponds to the point of time which is assigned to the projected network load snapshot. In other words, by comparing the predicted network load with the actual network load, the quality of the network load prediction algorithm may be determined. Then, based on the comparison result, the network load prediction algorithm can be (e.g., iteratively) controlled such that its quality increases.

The process of transforming a network load snapshot into a corresponding projected network load snapshot may be done on a per network load record basis. In this case, fine-granularity network load measurements (network load records with associated network load values) may be used in order to generate fine-grained network load predictions (based on projected network load records). Due to the use of fine granularity network load measurements, additional network load information reflected by the network load influencing factors can be taken into account quite effectively.

The process of transforming the network load snapshot into the projected network load snapshot may include a first transformation which transforms at least one network load snapshot into a first projected network load snapshot, and a second transformation which transforms the at least one network load snapshot into a second projected network load snapshot. In this way, it is, for example, possible to apply different trending scenarios (e.g., different sets of trending assumption parameters) to one single network load snapshot in order to determine the influence of both trending scenarios. The results of all trending scenarios may then for example be simultaneously visualized in one single diagram in order to easily compare them.

The at least one network load value may relate to at least one of user data and control data. As an example, the at least one network load value may comprise at least one of a traffic volume value, a physical link load value, a speech intensity value, and a control plane intensity value. The present technique is, of course, not limited to these examples.

The at least one network load influencing factor may comprise at least one of a user terminal model property, a user subscription property, a network access parameter property, and an availability of services and applications. Again, the present technique is not limited to these examples.

Before transforming a network load snapshot into a projected network load snapshot, at least one network load record of the network load snapshot may be artificially generated, modified, or deleted. This enables a network operator to use artificial or predetermined network load snapshots as input for the transformation algorithm. The artificial or predetermined network load snapshots may for example serve as test data sets for testing the transformation algorithm. In order to transform a network load snapshot into a corresponding projected network load snapshot, the transformation algorithms may modify at least one of the network load values and the network load influencing factors, or may artificially generate and delete network load records.

The network may be operated based on the projected network load snapshots. For example, the operation of the network may be controlled based on at least one of an accumulated network load and a mean network load obtained from one or a plurality of projected network load snapshots.

According to a second aspect, a computer program product is provided comprising program code portions for performing the steps of any of the methods presented herein when the computer program product is executed on one or more computing devices. According to another aspect, a computer-readable recording medium on which a computer program product is stored is provided.

According to a still further aspect, a device for projecting network load in a communication network is provided. The device comprises a providing unit configured to provide, for multiple subscriptions, a load snapshot comprising multiple network load records, wherein each network load record reflects network load caused by an individual subscription in the network at a particular point of time, and wherein each network load record comprises at least one network load value reflecting a network load caused by the corresponding subscription and at least one network load influencing factor reflecting a parameter associated with the subscription which has the potential of influencing the network load value. Further, the device comprises a transformation unit configured to transform the network load snapshot into a projected network load snapshot comprising multiple projected network load records, each projected network load record reflecting estimated network load caused by the corresponding subscription at a particular point of time in the future, wherein transforming of the network load snapshot into the corresponding projected network load snapshot is done based on both the network load values and the associated network load influencing factors.

The device may further comprise a controlling unit (e.g., connected to the transforming unit) configured to control operation of the network based on the projected network load snapshots.

The device may also comprise an adjusting unit (e.g., connected to the providing unit and the transformation unit) configured to control the process of transforming the network load snapshot into the projected network load snapshot based on a comparison between the projected network load snapshot generated by the transformation unit with actual network load snapshots generated by the generating unit at a point of time which corresponds to the point of time assigned to the projected network load snapshot.

Also, the device may comprise an input unit (like a keyboard or a data reception unit for inputting external data) enabling an operator of the network to artificially generate, modify or delete at least one network load record of a network load snapshot.

According to a further aspect, a communication network is provided comprising a device as presented herein.

BRIEF DESCRIPTION OF THE DRAWINGS

In the following, the present disclosure will be described in more detail with reference to exemplary embodiments illustrated in the drawings, wherein.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details. In the embodiments, the same reference numerals are used to denote the same or similar components. Moreover, the terms "subscription" and "subscriber" will be used interchangeably.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more DSPs and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

Figure 2:
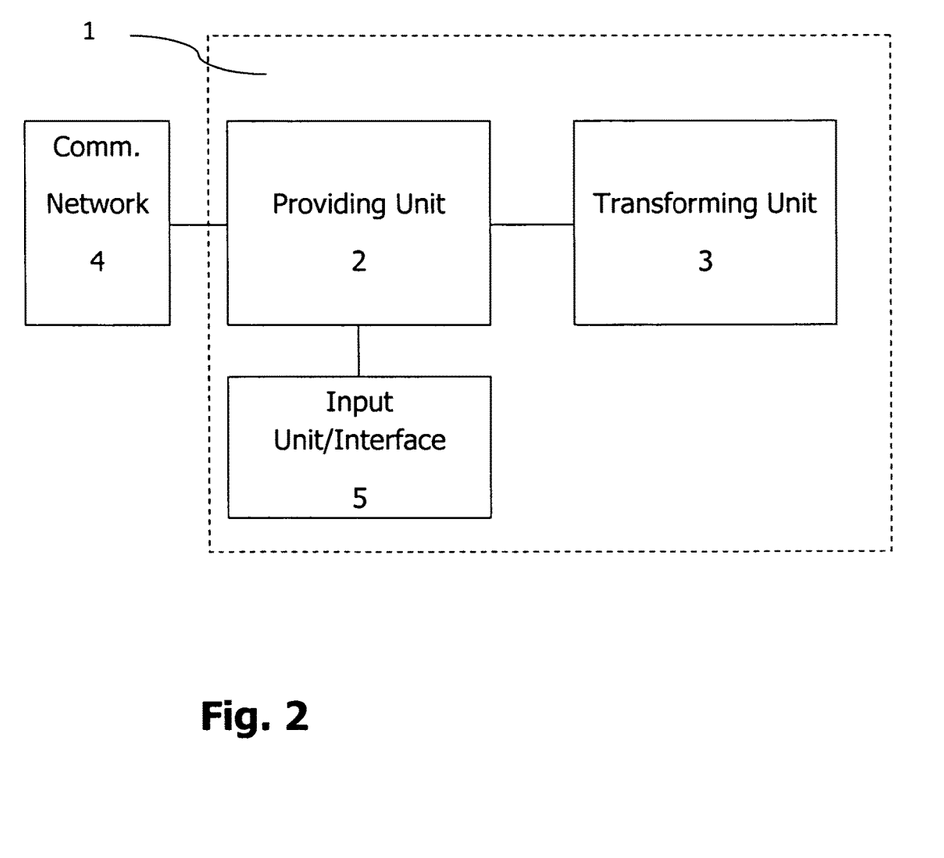
FIG. 2 is a schematic block diagram illustrating an embodiment of a device for projecting network load in a communication network.

FIG. 2 shows an embodiment of a device 1 for projecting network load in a communication network (e.g., in a IP network). The device 1 comprises a providing unit 2 (e.g., a database) configured to provide, for one or more subscriptions, at least one network load snapshot. Each network load snapshot comprises at least one network load record, wherein each network load record reflects network load caused by the corresponding subscription in the network at a particular point of time. Each network load record comprises at least one network load value reflecting a network load caused by the corresponding subscription and at least one network load influencing factor reflecting a parameter associated with the subscription which has the potential of influencing the network load value.

Further, the device comprises a transformation unit 3 (e.g., a processor) connected to the providing unit 2. The transformation unit 3 is configured to transform at least one network load snapshot into a corresponding projected network load snapshot comprising at least one projected network load record, each projected network load record reflecting estimated network load caused by the corresponding subscription at a particular point of time in the future.

Transforming of a network load snapshot into a corresponding projected network load snapshot is done based on both the network load values and the associated network load influencing factors.

In order to receive the at least one network load snapshot, the providing unit 2 may carry out, initiate or receive network load measurements for a communication network 4 connectable to the providing unit 2, or receive network load snapshot data via an input interface 5 connected to the providing unit 2. Alternatively, the device 1 may itself comprise a measurement unit (not shown). The measurements can be performed on a per subscription (and, optionally, per service) basis.

In the following, the operation of the device 1 illustrated in FIG. 2 will be described with reference to an exemplary method embodiment illustrated in the form of a flow diagram in FIG. 3

Figure 3:
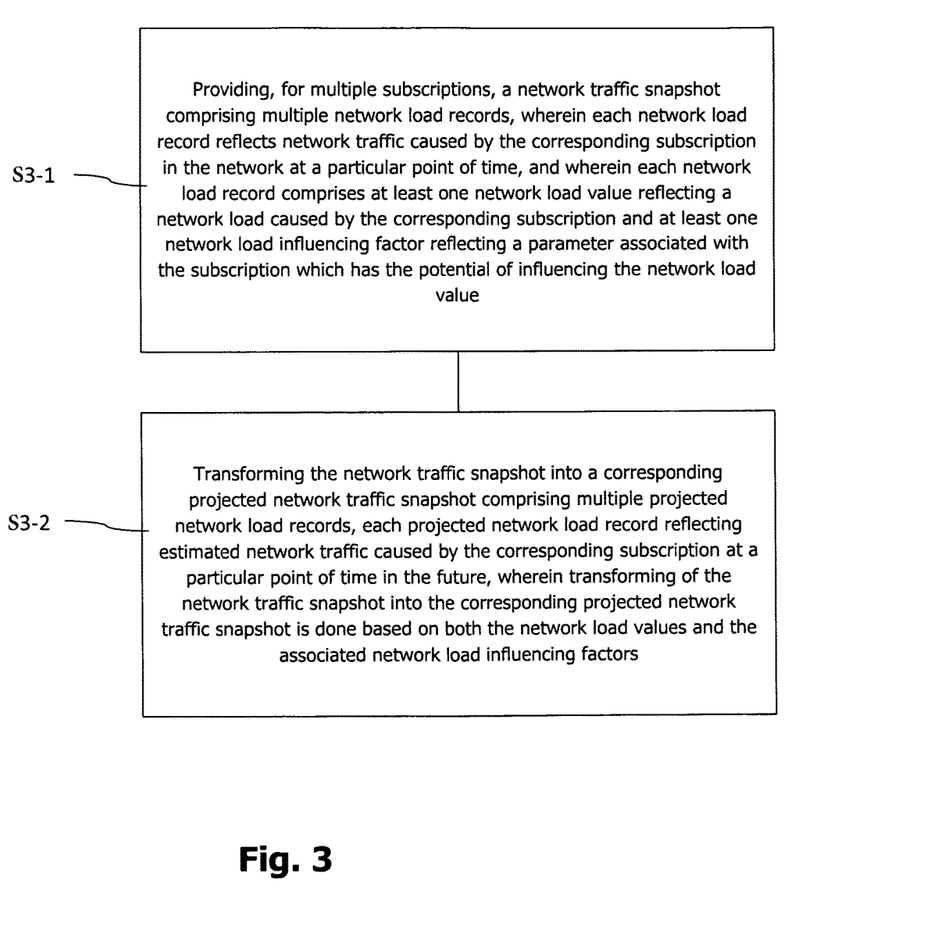
FIG. 3 is a flow chart illustrating a method embodiment of projecting network load in a communication network.

As shown in the flow diagram of FIG. 3, the device 1 may be used to carry out the following method for projecting network load in a communication network. In a first step S3-1, for multiple subscriptions, a network load snapshot is provided using the providing unit 2. The network load snapshot comprises multiple network load records. Each network load record reflects network load caused by the corresponding subscription in the network at a particular point of time (and, optionally, over a predetermined period of time, such as a month). Each network load record comprises at least one network load value reflecting a network load caused by the corresponding subscription and at least one network load influencing factor reflecting a parameter associated with the subscription which has the potential of influencing the network load value.

In a second step S3-2, the network load snapshot is transformed into a corresponding projected network load snapshot comprising multiple projected network load records using the transformation unit 3. Each projected network load record reflects estimated network load caused by the corresponding subscription at a particular point of time in the future. The transformation of a network load snapshot into a corresponding projected network load snapshot is done based on both the network load values and the associated network load influencing factors.

In the present embodiments, the term "network load value" may mean a numerical value describing any kind of user plane load component or control plane load component in a communication network including but not limited to: load volume [byte]; physical link load [bit/s]; speech intensity [Erlang]; and control plane event intensity [1/s].

The term "network load influencing factor" may mean any factor which influences network load in a communication network, including but not limited to: terminal model properties (including but not limited to terminal type, operating system (OS) screen size, radio capabilities); subscription properties (including but not limited to monthly data caps, bandwidth limitations); network access properties (including but not limited to access technology, coverage); and availability of services and applications.

Some of the network load influencing factors may be manually changeable, for example by network operators (e.g., subscription properties), via trending assumption parameters or otherwise. Some of the network load influencing factors may not be manually changeable (e.g., Over-The-Top (OTT) service availability).

The term "network load record" may denote one or more network load values and one or more associated network load influencing factors, and may describe a network load contribution within a communication network, e.g., a busy hour Radio Access Bearer (RAB) establishment event intensity from Facebook load of one (or several) Sony Ericsson Xperia Mini Pro terminal(s) with 2 GB monthly data allowance ("data cap").

For example, changing the type of an operating system based on which a subscriber browses the Internet may have an influence on the network load caused by the subscription. That is, for example, if a file is sent or retrieved by an application via an operating system which itself uses an e-mail client to send or retrieve the file, more network load may be involved than sending/retrieving the same file via an operating system that itself uses an FTP (File Transfer protocol) client (as an example for influence caused by changing the type of a network load influencing factor assigned to an application). As a further example, if an application so far has sent all files uncompressed, the a requirement of compressing all files before sending them will change the network load caused by the application since compressed files are smaller than uncompressed files (as an example for influence caused by adding a new network load influencing factor assigned to an application). In this way, by taking into account associated network load influencing factors, a more reliable network load prediction is achieved. According to an embodiment, network load influencing factors may be regarded as attributes based on which, for each of different applications (see FIG. 7 below), a network load value can be assigned. That is, to each application, a network load influencing factor or a set of network load influencing factors may be assigned.

Figure 4:
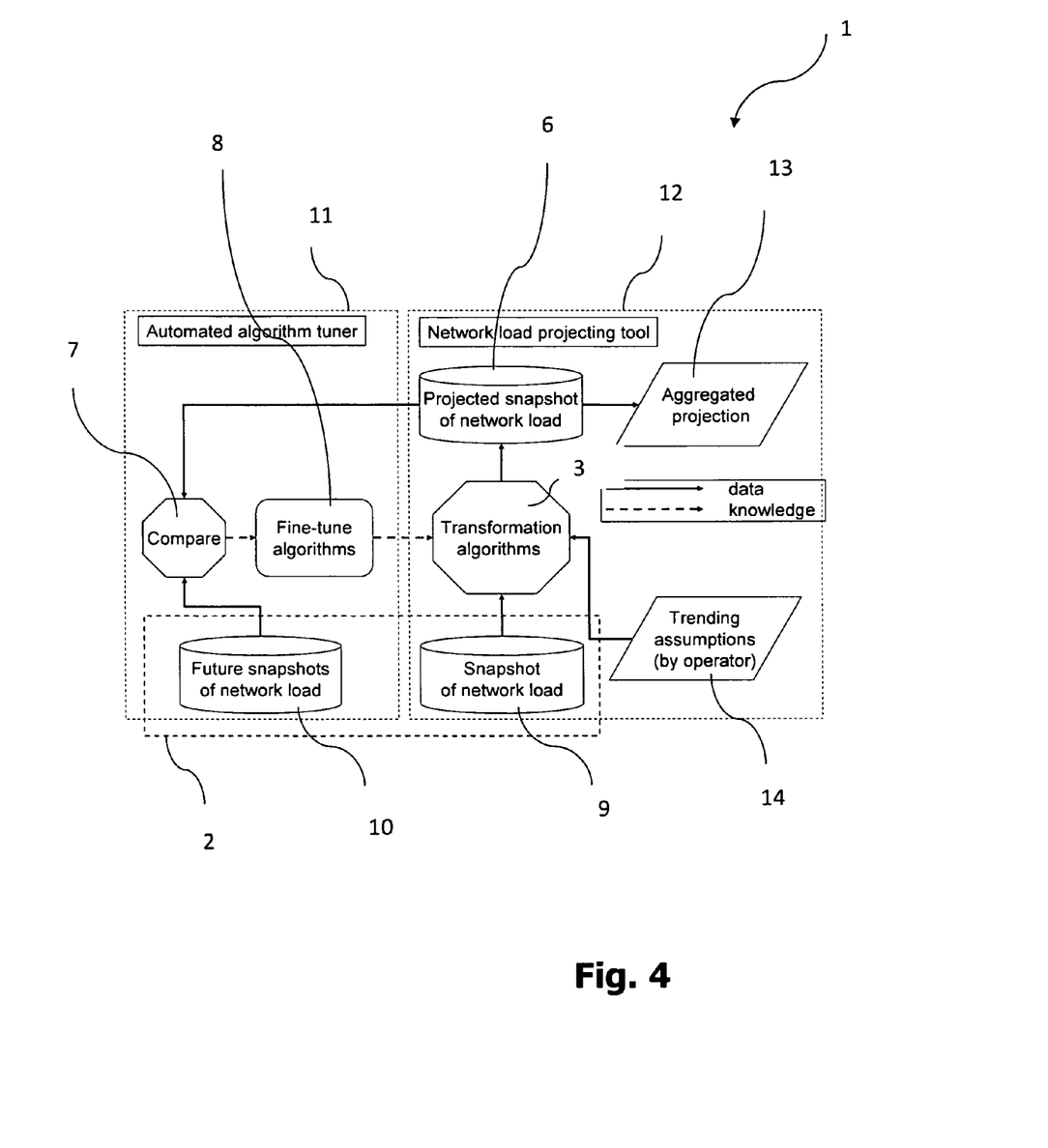
FIG. 4 is a schematic block diagram illustrating an embodiment of a device for projecting network load in a communication network.

FIG. 4 shows another embodiment of a device 1 for projecting network load in a communication network (as a possible detailed realization of the device 1 shown in FIG.

2). The device 1, a providing unit 2, a transformation unit 3, a projected network snapshot storing unit 6, a comparing unit 7, and a fine tuning unit 8.

The providing unit 2 comprises a first network snapshot storing unit 9 and a second network snapshot storing unit 10 in the form of dedicated databases. The first network snapshot storing unit 9 is connected to the transformation unit 3. The transformation unit 3 is connected to the projected network snapshot storing unit 6. The projected network snapshot storing unit 6 and the second network snapshot storing unit 10 are to the comparing unit 7. The comparing unit 7 is connected to the fine tuning unit 8, which in turn is connected to the transformation unit 3. The comparing unit 7, the fine tuning unit 8, and the second network snapshot storing unit 10 together form an adjusting unit 11. The projected network snapshot storing unit 6, the transformation unit 3, and the first network snapshot storing unit 9 form a basic network load projection device 12. The adjusting unit 11 is not obligatory but may optionally be added to the basic network load projection device 12. The transformation unit 3 is further configured to receive one or more trending assumption parameters 14.

The operation of the device 1 will now be described in greater detail. In a first step, basic network load projection device 12 retrieves, for one or more subscriptions, at least one network load snapshot from the first network snapshot storing unit 9. Further, the basic network load projection device 12 transforms, using the transformation unit 3, at least one retrieved network load snapshot into a corresponding projected network load snapshot. Transformation of a network load snapshot into a corresponding projected network load snapshot is done based on the trending assumption parameter set 14 which determines whether/how network load values and network load influencing factors should be modified for projection, and whether/how network load records should be artificially generated or deleted in order to generate the projected network load records of the projected network load snapshots. The projected network load snapshots are stored within the projected network snapshot storing unit 6. Based on the aggregated projected network load records, network projection data 13, e.g., aggregated network projection data, may be generated.

Transforming network load snapshots into corresponding projected network load snapshots may be additionally controlled (i.e., in addition to the trending assumption parameter set 14) by the adjusting unit 11. The adjusting unit 11 influences the transforming process based on a comparison result of a comparison between the projected (i.e., estimated) network load snapshots (stored in the projected network snapshot storing unit 6) generated by the transformation unit with actual (i.e., measured) network load snapshots (stored in the second network snapshot storing unit 10) generated at point of times which correspond to the points of time assigned to the respective projected network load snapshots. Based on the comparison result, the fine tuning unit 8 outputs data which adjusts parameters of the algorithms of the transformation unit 3 which perform the transformation. For example, if the aggregated network load reflected by the aggregated network projection data 13 is too high, compared to actual measurements, the fine tuning unit 8 may change the algorithms of the transformation unit 3 such that the network load values of the projected network load records are decreased.

Figure 5:
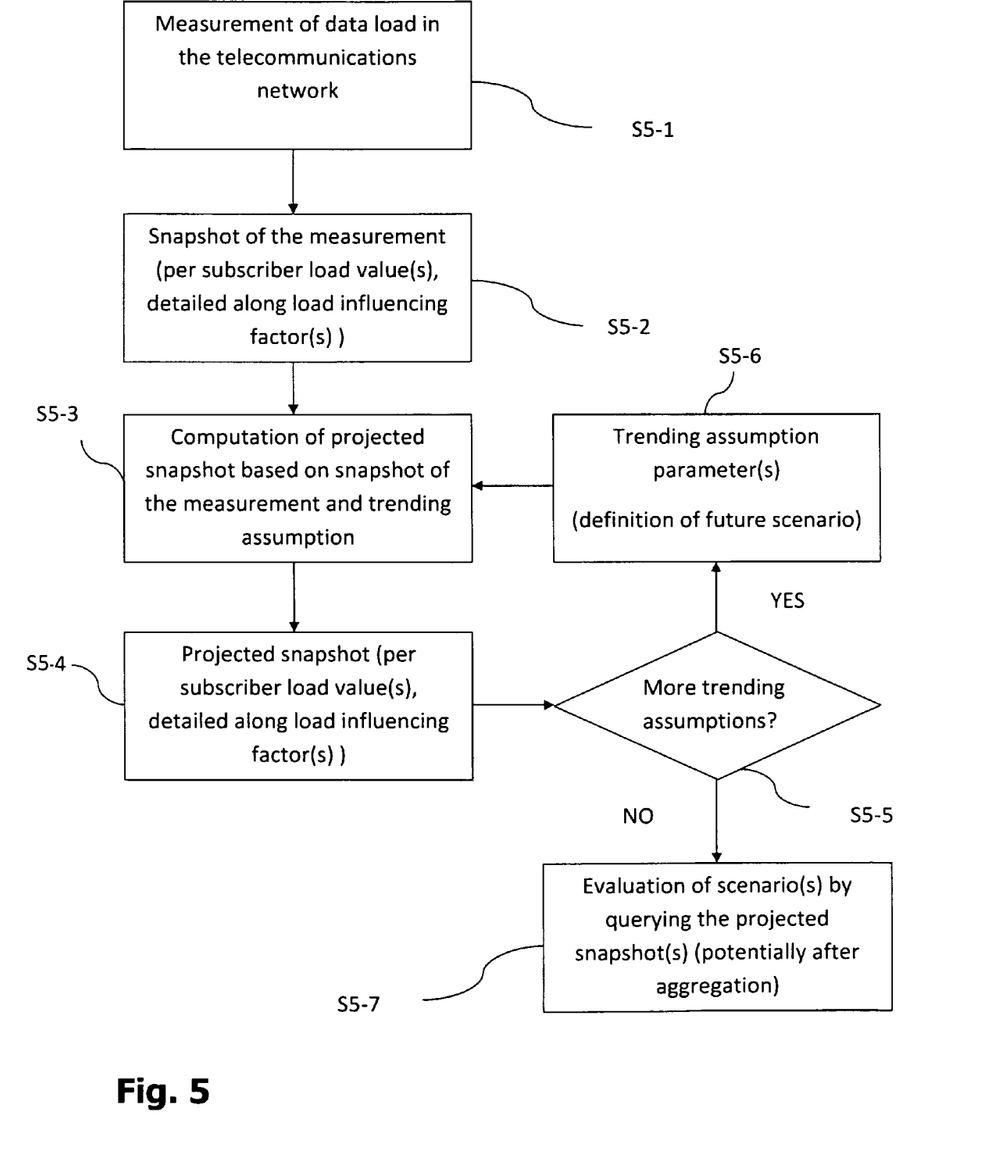
FIG. 5 is a flow chart illustrating a method embodiment of projecting network load in a communication network.

Using the device 1 of FIG. 2 or 4, the following method embodiment for projecting network load in a communication network may be carried out which is shown in FIG. 5. In a first step S5-1, a detailed measurement of network load in the telecommunication network is carried out over a predetermined period of time for each of multiple individual subscriptions. Based on this measurement, in a second step S5-2, one or several network load snapshots are generated and stored (in the first network snapshot storing unit 9). Each network load snapshot comprises a plurality of network load records, wherein each network load record is assigned to one of the multiple subscribers ("network users"). Each network load record comprises one or more network load values, optionally sorted by network load influencing factors. Thus, a network load snapshot may comprise network load records of several subscriptions, and several network load records per subscription.

In a third step S5-3, at least one network load snapshot is transformed, based on at least one trending assumption parameter (a definition of a future scenario) into a corresponding projected network load snapshot comprising projected network load records (using the transformation unit 3 based on the trending assumption parameters 14). The corresponding transformation process may comprise modifying (e.g., changing or replacing) the network load influencing factors and/or load values in the individual network load records based on the one or more trending assumption parameters. The estimated network load indicated by a projected network load record may then be determined based on the (modified) network load influencing factor on the one hand and the associated (modified) network load value of the original network load record on the other.

Similar to the network load snapshots, each projected network load snapshot comprises a plurality of projected network load records, wherein each projected network load record is assigned to one of the plurality of subscribers. Thus, a projected network load snapshot may comprise network load records of several subscribers, respectively, and several network load records per subscriber. The number and values of data entries (network load values and, optionally, network load influencing factors) of the projected network load records varies depending on the trending assumption parameters that control the transformation process.

The thus generated projected network load snapshots are stored in a fourth step S5-4 (in the projected network snapshot storing unit 6). In a step S5-5, it is determined whether the same network load snapshots which have already been transformed into first projected network load snapshots based on a first trending assumption parameter set should again be transformed into additional second projected network load snapshots based on a second trending assumption parameter set. If yes, then in a sixth step S5-6 a new trending assumption parameter set is provided, and the third and fourth step S5-3 and S5-4 are repeated. If no, in a seventh step S5-7, a scenario of future network load is determined based on the projected network load snapshots stored in the fourth step S5-4. One or several future scenarios are presented to a network operator, wherein each future scenario corresponds to a trending assumption parameter set.

Different network load snapshots may correspond to different measurements taken at different points of time. Alternatively, different network load snapshots may correspond to different network load situations at the same point of time (e.g., artificial network load data input by a network operator via the input interface 5). In a similar manner, different projected network load snapshots generated using the same trending assumption may correspond to different measurements taken at different points of time. Alternatively, different projected network load snapshots may correspond to different network load situations at the same point of time, created based on different trending scenarios.

Figure 6:
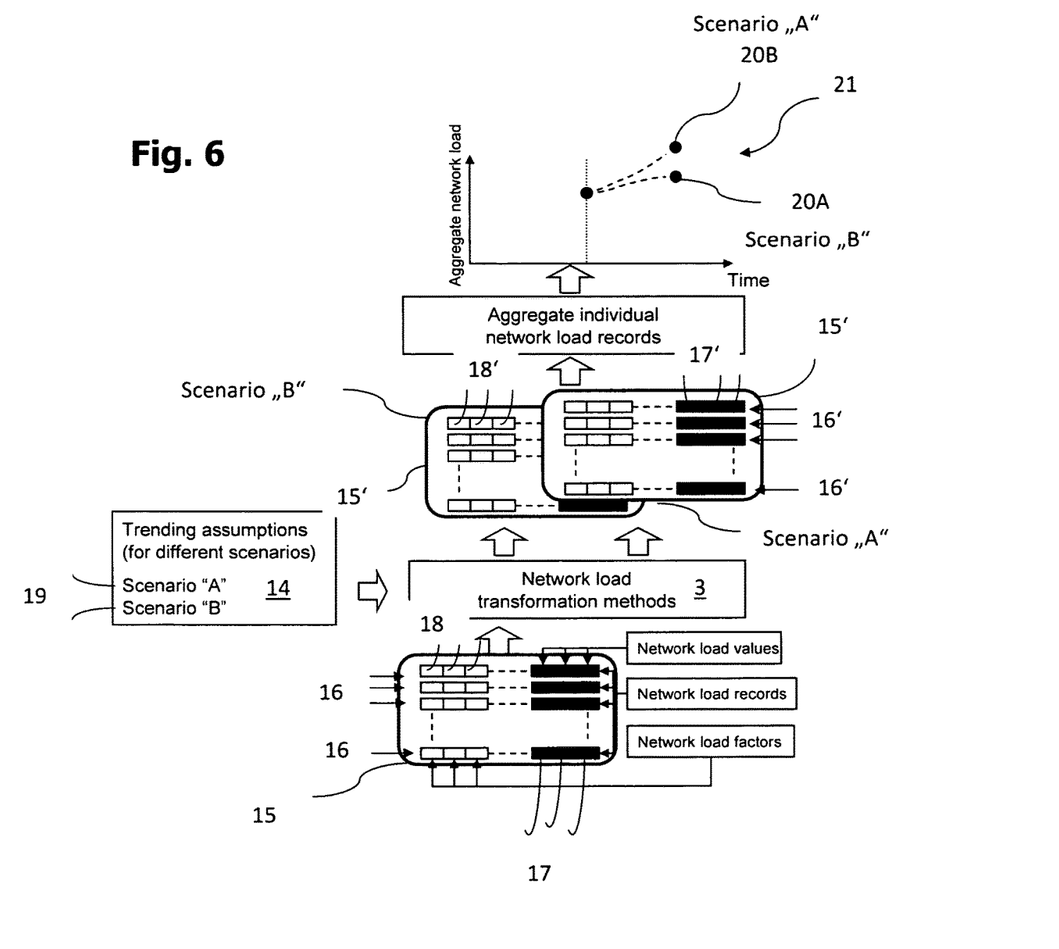
FIG. 6 is a flow chart illustrating a method embodiment of projecting network load in a communication network.

FIG. 6 shows a possible embodiment which illustrates some aspects of steps S5-2 to S5-7 in FIG. 5 in more detail. In this embodiment, in the second step S5-2, one or several network load snapshots 15 are generated from a network load measurement process and stored. Each network load snapshot 15 comprises a plurality of network load records 16, wherein each network load record 16 is assigned to one of a plurality of subscriptions. Each network load record 16 comprises one or more network load values 17 sorted (classified) by network load influencing factors 18. Thus, a network load snapshot 15 may comprise network load records 16 of several subscriptions, and several network load records 16 per subscription.

In the third step S5-3, at least one network load snapshot 15 is transformed, based on a trending assumption parameter set 19, into a corresponding projected network load snapshot 15' comprising at least one projected network load record 16'. Similar to the network load snapshots 15, each projected network load snapshot 15' comprises a plurality of projected network load records 16', wherein each projected network load 16' record is assigned to one of the plurality of subscribers. Each projected network load record 16' comprises one or more network load values 17' sorted (classified) by network load influencing factors 18'. Thus, a projected network load snapshot 15' may comprise network load records 16' of several subscriptions, and several network load records 16' per subscription. The number and values of data entries (network load values 17' and network load influencing factors 18') of the projected network load records 16' may vary depending on the individual trending assumption parameter set 19 which controls the transformation process. The thus generated projected network load snapshots 15' are stored in the fourth step S5-4. For each trending assumption 19, an individual projected network load snapshot 15' is generated from the same network load snapshot 15 (fifth and sixth steps S5-5, S5-6). A scenario of future network load is determined by load value aggregation over the records 16' of projected network load snapshots 15' in the seventh step S5-7 based on the projected network load snapshots 16' stored in the fourth step S5-4.

In the embodiment of FIG. 6, two future scenarios (Scenario "A", Scenario "B") are considered by a network operator, wherein each future scenario corresponds to a trending assumption 19. For projected network load snapshot 15' Scenario "A", a total network load caused by all subscribers (i.e., the sum of all network load values 17' of all network load records 16' of the projected network load snapshot 15' Scenario "A") together is presented to the network operator by one network load value 20A in a total network load diagram 21. In the same way, for projected network load snapshot 15' Scenario "B", a total network load caused by all subscribers (i.e., the sum of all network load values 17' of all network load records 16' of the projected network load snapshot 15' Scenario "B") together is presented to the network operator by one network load value 20B in the total network load diagram 21. Thus, for each pair of network load snapshot 15 and trending assumption parameter set 19, a corresponding network load value 20A, 20B may be generated in the total network load diagram 21. Thus, a network operator can, at one glance, see the different effects of different network scenarios 19.

Figure 7:
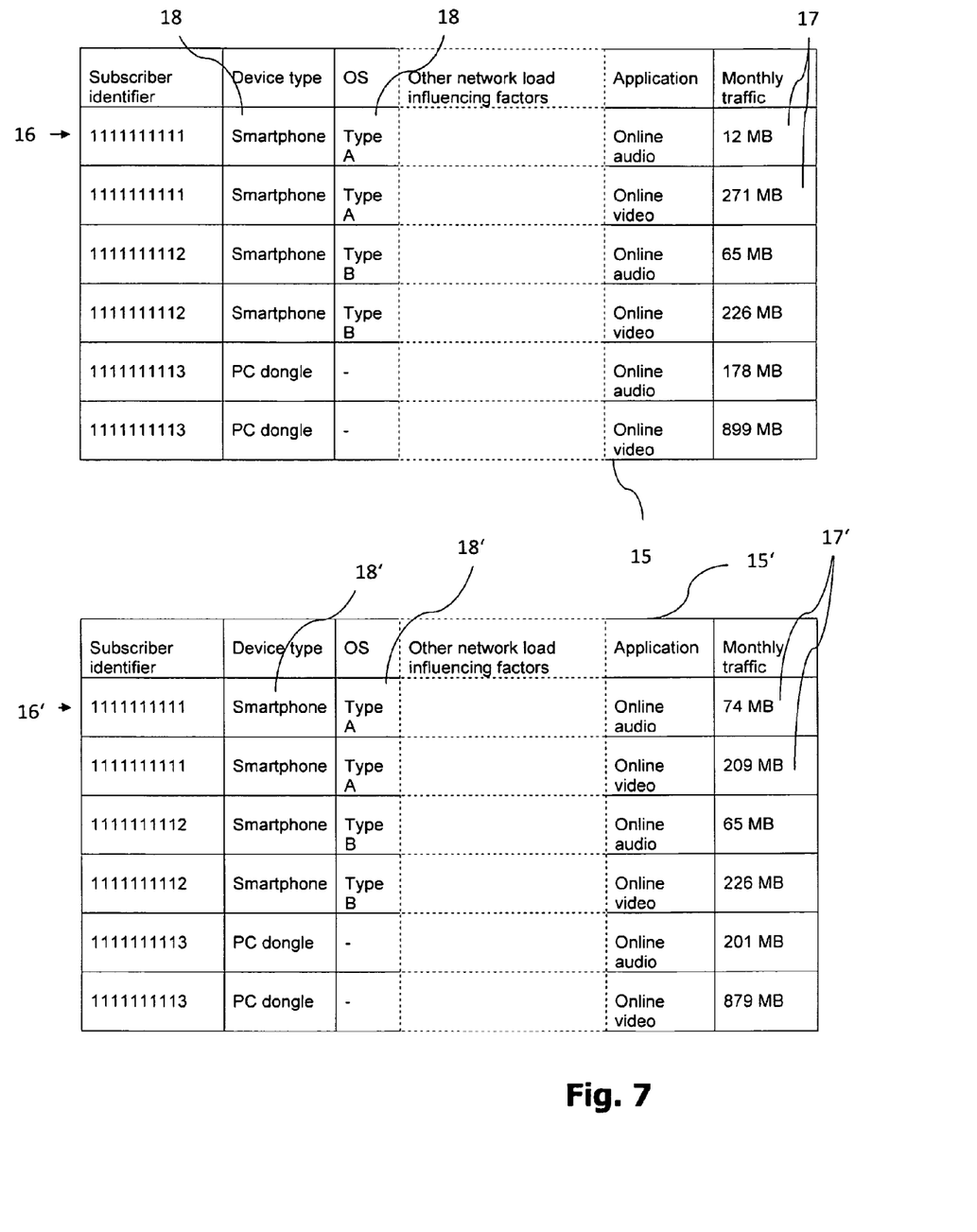
FIG. 7 is an example of a network load snapshot transformation in a method embodiment of projecting network load in a communication network.

FIG. 7 shows a more detailed example of a transformation of a network load snapshot 15 into a projected network load snapshot 15' according to any of the embodiments described above. In this example, a first subscriber uses a smartphone type A, thereby causing audio network load (first audio online application) and video network load (first video online application) in the network 4. A second subscriber uses a smartphone type B, thereby causing audio network load (second video online application) and video network load (second video online application) in the network 4. A third subscriber uses a PC data dongle, thereby causing audio network load (third video online application) and video network load (third video online application) in the network 4.

The trending assumption which transforms the network load snapshot 15 into a projected network load snapshot 15' in this example results in that the hardware used by the subscribers remains the same in the future, however that the first subscriber listens more and watches less, that the second subscriber maintains his network usage habits and keeps his hardware, and that the third subscriber keeps his hardware, however listens more and watches less. In this way, the network load values 17' will change.

The transformation of the network load snapshot 15 into the projected network load snapshot 15' may for example be the result from following trending scenario: Assuming that an internationally popular audio streaming service becomes available in the country of the operator, determining the network load effect of a resulting increase of audio traffic of subscribers holding a Smartphone with a given Type A operating system, assuming that Smartphones running the operating system Type B are not affected (the service being disabled on this operating system); and determining the network load effect of a resulting increase (although less radically) of audio traffic of PC subscribers. The corresponding trending scenario can be translated into a trending assumption parameter set. This parameter set may then be readily applied to the network load values 17 to obtain the projected network load 17'. Alternatively, or in addition, the parameter set may be applied to one or more of the network load influencing factors 18, which may result in modified network load influencing factors 18', wherein the modified network load influencing factors 18' may be applied to the network load value 17 to obtain the projected network load values 17'.

A further example of a trending assumption (not shown) could for example be that the habits of all subscribers remain the same, however that all or some subscriber change their hardware used for accessing the communication network. In this case, the network load influencing factors 18' would change (when applying an associated trending assumption parameter set). Assuming that different hardware also causes different network load, additionally also the network load values 17' would change in this case (when applying an associated trending assumption parameter set).

In the following description, further aspects and embodiments of the present disclosure will be discussed that may be combined with any of the embodiments discussed above.

Certain embodiments may allow determining projected subscriber load demand, and the resulting aggregate network load for a given communication network 4, taking into consideration the evolution of various underlying factors that influence network load, such as terminal penetrations, data plans, etc. Therefore, it is possible to evaluate different high level strategy scenarios, in terms of projected load demands and associated control and user plane load.

As has already been mentioned, trending assumptions may be applied as parameters to the underlying factors as well, i.e., can generate, change or delete underlying factors. Trending assumption parameters may modulate a detailed ("per user") measurement snapshot. This approach results in a very flexible projection of network load which in return serves as a more detailed decision support than simple projection on aggregations of network load.

An input of a network load transformation algorithm (the algorithm which transforms a network load snapshot into a projected network load snapshot) may comprise a set of network load records (which form a network load snapshot), and trending assumption parameters for, e.g., one or more network load influencing factors within the communications network, such as an assumed evolution of the number of Android smartphones, an assumed evolution of data caps, etc. An output of the network load transformation algorithm comprises modified sets of network load records (projected network load records) describing the projected network load subject to the trending assumptions. Any kind of transformation may be done on the original network load record set (network load snapshot), including but not limited to: changing network load influencing factor values; changing network load values; duplicating records; removing records; and adding new records.

The fine granularity description of current network load components which may form the basis for generating a network load snapshot (i.e, network load records with the load values) may, for example, be retrieved from correlation of data from one or more of the following sources: Deep Packet Inspection (DPI) measurement of user load (user plane); node event logs (control plane); and subscription information from a charging system or an network operator data center.

Per subscriber random sampling may be used to make data retrieval and handling scalable in large networks. That is, instead of manipulating a set of one or more network load records for each subscriber in the network of an operator having a relatively large subscription base, one subscriber out of, for example, a hundred may be randomly chosen, and only the network load records of the chosen subscribers may be used for network load prediction.

According to embodiments of the present invention, projected network load values may also be sorted and visualized depending on any network load influencing parameter. This makes it possible to extract pre-defined subscriber groups and their effects on the network load. For instance, if subscriber age information is available, an operator might be interested in grouping the subscribers according to age, to see in the output of the transformations whether a younger generation contributes more to a projected total network load growth, and if so, how largely.

The trending assumptions underlying the network prediction may for example be derived from measurements in other networks (e.g., where a new service has already been introduced), in order to obtain scaling factors (as an example of "trending assumption parameters") for the transformation which transform the network traffic snapshot into the projected network traffic snapshot (e.g., by changing network load values in accordance with the scaling factor). Possible side effects may also be taken into account, e.g., a decrease of the projected online video traffic as the emerging audio service becomes a substitute application for the video application. In this transformation example only the network load values are modified, the number of network load records and the values of the network load influencing factors remain the same. This latter number and these latter values may be changed in other embodiments.

Further examples of trending assumption latter include determining the network load effect resulting from an increase of Android Smartphone penetration in the network by 50%; determining the network load effect resulting from an increase of data allowance of iPad terminals from 1 GB/month to 2 GB/month; determining the network load effect resulting from shaping BitTorrent traffic of dongle users to 256 kbit/s during busy hour period; determining the network load effect resulting from increasing population coverage of LTE from 10% to 50%; and determining the network load effect resulting from increasing an average YouTube encoding bitrates by 30%. The underlying trending assumption parameters may be generated from these numbers.

The transformation algorithms may be built automatically via intelligent learning from measurements.

As has been shown above, network load in a communication network depends on a large number of factors in a very complex way. A fine granularity description of elementary load components via network load records inherently contains all of these complex relationships for the current network load. Many of these relationships also hold for projected future network loads. Network load transformation algorithms in embodiments of the present invention may make use of these relationships. In contrast, "black box" models of existing forecasting solutions cannot use this underlying knowledge.

It has been become apparent that network operators have an impact on many of the network load influencing factors, such as terminal penetrations, data plans and load management. The proposed technique allows operators to compare the network load impact resulting from different strategies which change the network load influencing factors in different ways. In contrast, "black box" models only provide one single "most probable" forecast; they do not support evaluation of different scenarios. In certain implementations, one single measurement is needed to make a forecast, without historical data.

While the technique presented herein has been described in relation to exemplary embodiments, it is to be understood that this description is for illustrative purposes only. Accordingly, it is intended that the invention be limited only be the scope of the claims appended hereto.

The invention claimed is:

1. A method for projecting network load in a communication network, comprising:
providing, for multiple subscriptions, a network load snapshot comprising multiple network load records, wherein each network load record reflects network load caused by an individual subscription in the network at a particular point of time, and wherein each network load record comprises at least one network load value reflecting a network load caused by the corresponding subscription and at least one network load influencing factor reflecting a parameter associated with the subscription which has the potential of influencing the network load value; transforming the network load snapshot into a projected network load snapshot comprising multiple projected network load records, each projected network load record reflecting estimated network load caused by the corresponding subscription at a particular point of time in the future, wherein transforming of the network load snapshot into the corresponding projected network load snapshot is done based on both the network load values and the associated network load influencing factors, wherein the process of transforming the network load snapshot into the corresponding projected network load snapshot is done based on one or more trending assumption parameters which reflect a future scenario affecting the network load respectively caused by the subscriptions; and modifying the network load influencing factors based on the one or more trending assumption parameters, wherein transforming the network load snapshot into the projected network load snapshot is based on the network load values and modified network load influencing factors; and operating the communication network based on projected network load snapshots; wherein the process of transforming the network load snapshot into the projected network load snapshot is done using an algorithm which is adjusted based on a comparison process which compares the projected network load snapshot with an actual network load snapshot generated at a point of time which corresponds to the point of time which is assigned to the projected network load snapshot.

2. The method of claim 1, wherein the one or more trending assumption parameters relate to an evolution of at least one of a data cap, a user terminal type population, population of an operating system of a user terminal, and a population of a user application.

3. A method for projecting network load in a communication network, comprising: providing, for multiple subscriptions, a network load snapshot comprising multiple network load records, wherein each network load record reflects network load caused by an individual subscription in the communication network at a particular point of time, and wherein each network load record comprises at least one network load value reflecting a network load caused by the corresponding subscription and at least one network load influencing factor reflecting a parameter associated with the subscription which has the potential of influencing the network load value;

transforming the network load snapshot into a projected network load snapshot comprising multiple projected network load records, each projected network load record reflecting estimated network load caused by the corresponding subscription at a particular point of time in the future, wherein transforming of the network load snapshot into the corresponding projected network load snapshot is done based on both the network load values and the associated network load influencing factors, wherein the process of transforming the network load snapshot into the corresponding projected network load snapshot is done based on one or more trending assumption parameters which reflect a future scenario affecting the network load respectively caused by the subscriptions; and modifying the network load influencing factors based on the one or more trending assumption parameters, wherein transforming the network load snapshot into the projected network load snapshot is based on the network load values and modified network load influencing factors; and operating the communication network based on projected network load snapshots;

wherein the process of transforming the network load snapshot into the corresponding projected network load snapshot is done on a per network load record basis.

4. A method for projecting network load in a communication network, comprising: providing, for multiple subscriptions, a network load snapshot comprising multiple network load records, wherein each network load record reflects network load caused by an individual subscription in the communication network at a particular point of time, and wherein each network load record comprises at least one network load value reflecting a network load caused by the corresponding subscription and at least one network load influencing factor reflecting a parameter associated with the subscription which has the potential of influencing the network load value; transforming the network load snapshot into a projected network load snapshot comprising multiple projected network load records, each projected network load record reflecting estimated network load caused by the corresponding subscription at a particular point of time in the future, wherein transforming of the network load snapshot into the corresponding projected network load snapshot is done based on both the network load values and the associated network load influencing factors, wherein the process of transforming the network load snapshot into the corresponding projected network load snapshot is done based on one or more trending assumption parameters which reflect a future scenario affecting the network load respectively caused by the subscriptions; and modifying the network load influencing factors based on the one or more trending assumption parameters, wherein transforming the network load snapshot into the projected network load snapshot is based on the network load values and modified network load influencing factors; and operating the network based on projected network load snapshots; wherein the process of transforming the network load snapshot into the projected network load snapshot includes a first transformation which transforms at least one network load snapshot into a first projected network load snapshot, and a second transformation which transforms the at least one network load snapshot into a second projected network load snapshot.

5. The method according to claim 1, wherein the at least one network load value relates to at least one of user data and control data.

6. The method according to claim 1, wherein the at least one network load value comprises at least one of a traffic volume value, a physical link load value, a speech intensity value, and a control plane intensity value.

7. The method according to claim 1, wherein the at least one network load influencing factors comprises at least one of a user terminal property, a user subscription property, a network access parameter property, and an availability of services and applications.

8. The method according to claim 1, wherein, before transforming the network load snapshot into the corresponding projected network load snapshot, at least one network load record of the network load snapshot is artificially generated, modified, or deleted.

9. The method according to claim 1, wherein the process of transforming the network load snapshot into the corresponding projected network load snapshot comprises modifying at least one of network load values, network load influencing factors, and artificially generating and artificially deleting network load records.

10. The method according to claim 1, wherein the operation of the communication network is controlled based on at least one of an accumulated network load and a mean network load obtained from a plurality of projected network load snapshots.

11. A device for projecting network load in a communication network, the device comprising: a providing unit configured to provide, for multiple subscriptions, a network load snapshot comprising multiple network load records, wherein each network load record reflects network load caused by an individual subscription in the communication network at a particular point of time, and wherein each network load record comprises at least one network load value reflecting a network load caused by the corresponding subscription and at least one network load influencing factor reflecting a parameter associated with the subscription which has the potential of influencing the network load value; a transformation unit configured to transform the network load snapshot into a projected network load snapshot comprising multiple projected network load records, each projected network load record reflecting estimated network load caused by the corresponding subscription at a particular point of time in the future, wherein transforming of the network load snapshot into the corresponding projected network load snapshot is done based on both the network load values and the associated network load influencing factors, wherein the transformation unit is configured to transform the network load snapshot into the corresponding projected network load snapshot based on one or more trending assumption parameters which reflect a future scenario affecting the network load respectively caused by the subscriptions, and to modify the network load influencing factors based on the one or more trending assumption parameters, wherein transforming the network load snapshot into the projected network load snapshot is based on the network load values and modified network load influencing factors; and an adjusting unit connected to the providing unit and the transformation unit and configured to control the process of transforming the network load snapshot into a projected network load snapshot based on a comparison between the projected network load snapshot generated by the transformation unit with an actual network load snapshot generated at a point of time which corresponds to the point of time assigned to the projected network load snapshot; and a controlling unit connected to the transforming unit and configured to control operation of the communication network based on projected network load snapshots.

12. The device according to claim 11, further comprising an input unit enabling an operator of the communication network to artificially generate, modify or delete at least one network load record of a network load snapshot.

* * * * *